(12) United States Patent
Kouzu

(10) Patent No.: US 7,171,364 B2
(45) Date of Patent: Jan. 30, 2007

(54) VOICE ASSISTANT APPARATUS INPUTTING A KEY

(75) Inventor: Norio Kouzu, Tagata-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 712 days.

(21) Appl. No.: 10/163,600

(22) Filed: Jun. 7, 2002

(65) Prior Publication Data

US 2004/0054540 A1    Mar. 18, 2004

(51) Int. Cl.
*G10L 11/00* (2006.01)
*G10L 21/00* (2006.01)

(52) U.S. Cl. ............... 704/271; 704/270; 704/270.1; 704/272

(58) Field of Classification Search ............ 704/275, 704/271, 270.1, 272, 270
See application file for complete search history.

(56) References Cited

U.S. PATENT DOCUMENTS

| | | | |
|---|---|---|---|
| 4,677,569 A * | 6/1987 | Nakano et al. ............. 704/275 |
| 5,506,578 A * | 4/1996 | Kishi et al. ................. 701/23 |
| 5,559,511 A * | 9/1996 | Ito et al. ..................... 701/225 |
| 6,587,039 B1 * | 7/2003 | Woestemeyer et al. .. 340/425.5 |
| 6,728,343 B1 * | 4/2004 | Taylor et al. ................ 379/71 |
| 2002/0069068 A1 * | 6/2002 | Nemoto ....................... 704/271 |

FOREIGN PATENT DOCUMENTS

| | | |
|---|---|---|
| JP | 10-56676 | 2/1998 |
| JP | 11-212695 | 8/1999 |
| JP | 11-334493 | 12/1999 |

* cited by examiner

*Primary Examiner*—Richemond Dorvil
*Assistant Examiner*—Thomas E. Shortledge
(74) *Attorney, Agent, or Firm*—Foley & Lardner LLP

(57) ABSTRACT

In a key-input voice assistant apparatus of the present invention, a mode switching key is used to switch the operation mode between a normal mode in which a function assigned to a key is executed when key input is detected and a voice guide mode in which a voice is used for a guide. The apparatus determines whether or not key information indicative of the detection of the key is stored when it detects the key input in the voice guide mode, stores the key information and outputs voice information assigned to the key if it concludes that the key information is not stored, and executes the function assigned to the key if it concludes that the key information is stored.

10 Claims, 5 Drawing Sheets

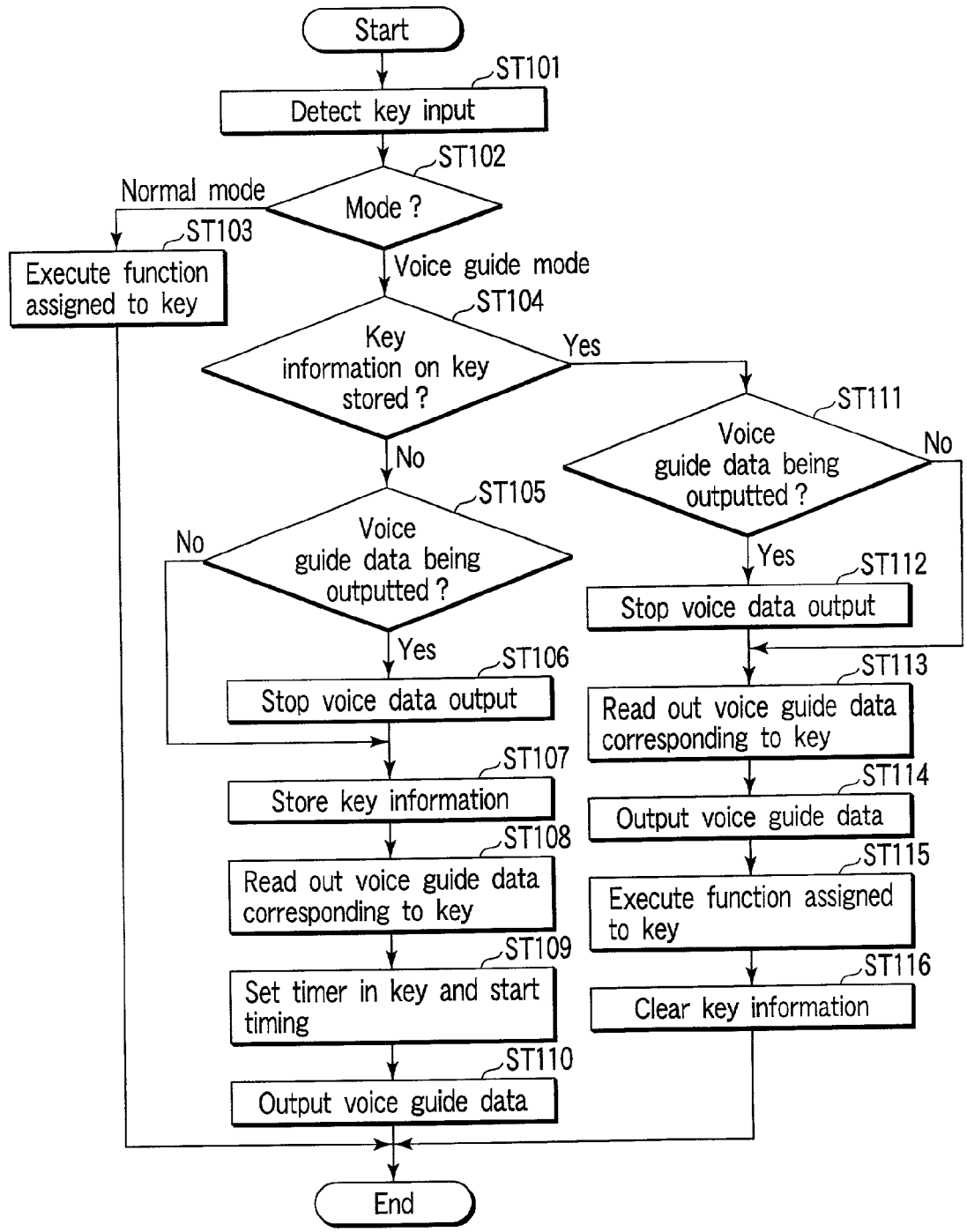
F I G. 4

VOICE ASSISTANT APPARATUS INPUTTING A KEY

BACKGROUND OF THE INVENTION

1. Field of the Invention

The present invention relates to a key-input voice assistant apparatus capable of effecting a voice guide for key input.

2. Description of the Related Art

Known is a key-input voice assistant apparatus that has a function to announce the content of execution vocally the moment a key input is made. If an operator depresses a "START" key of this apparatus, for example, "START" is announced, and at the same time, "START" is executed. In the case of this apparatus, the operator can easily recognize the content of execution of the depressed key. However, the operator cannot know in advance whether or not the input suits his/her intention.

Also known is a key-input voice assistant apparatus in the which there is a time lag between a voice guide and the execution of input, depending on the difference between the positions of a plurality of key contacts or the variation in the depth of the operator's depression of the key. According to this apparatus, no input can be executed if the operator ceases to depress the key at a contact position for voice guide. Accordingly, the operator can learn in advance the content that is executed by key input. In the case where the operator depresses the key of this apparatus to a contact position for the execution of input without stopping the key depression at the contact position for voice guide, however, input is inevitably executed even if the key is not the one that suits the operator's intention.

The operator sometimes feels the voice guides of the key-input voice assistant apparatus to be troublesome when he/she executes key input. However, the voice guides of the key-input voice assistant apparatus can be very effective if the operator has weak sight, for example.

BRIEF SUMMARY OF THE INVENTION

The object of the present invention is to provide a key-input voice assistant apparatus capable of easily switching the presence of a voice guide for key input, thereby effecting key input involving the voice guide at an operator's request and securely inputting the operator's desired key.

A key-input voice assistant apparatus according to an aspect of the present invention comprises: a key for inputting; a normal mode which executes a function assigned to the key when key input is detected; a voice information storage section which stores the content of execution of the function assigned to the key as voice information; a voice output mechanism which outputs the voice information; a key information storage section which stores key information indicative of the detection of the key input in the voice guide mode; a voice guide mode in which whether or not the key is detected of the key information storage section is determined when the key input is detected, the key information is stored in the key information storage section and the voice information assigned to the key is outputted when it is concluded that the key information is not stored, and the function assigned to the key is executed when it is concluded that the key information is stored in the key information storage section; and a mode switching key which switches the operation mode between the normal mode and the voice guide mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a diagram showing a flow of processing executed when key input is detected.

DETAILED DESCRIPTION OF THE INVENTION

Figure 1:
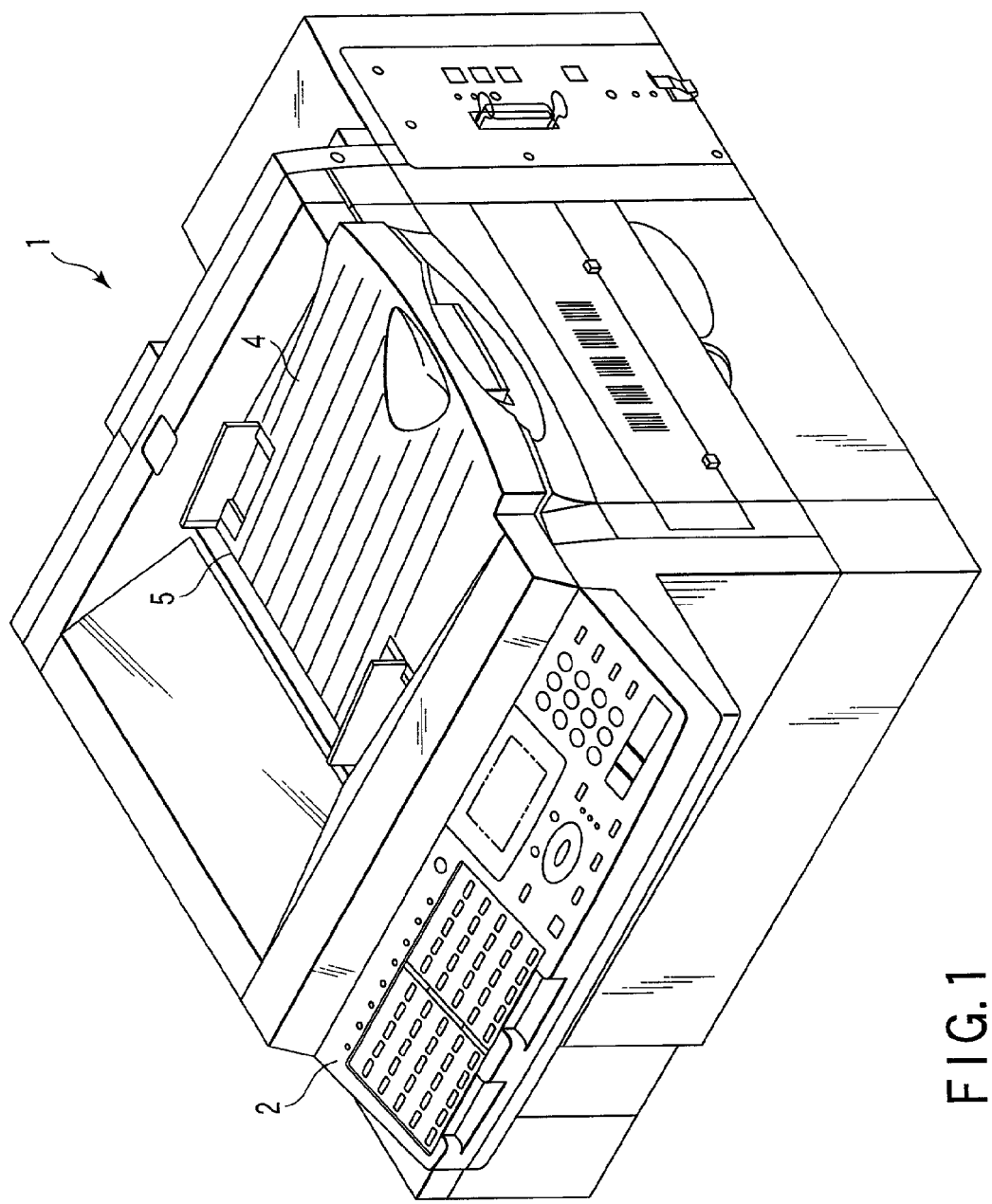
FIG. 1 is a view showing a multifunction machine according to one embodiment of the present invention.

The following is a description of one embodiment in which a key-input voice assistant apparatus of the present invention is applied to a multifunction machine 1 shown in FIG. 1.

The multifunction machine 1 comprises a control panel 2, a cassette 3 for storing paper, an original table 4 that carries an original thereon, an inlet slot 5 through which the original can be delivered to a scanner unit.

Figure 2:
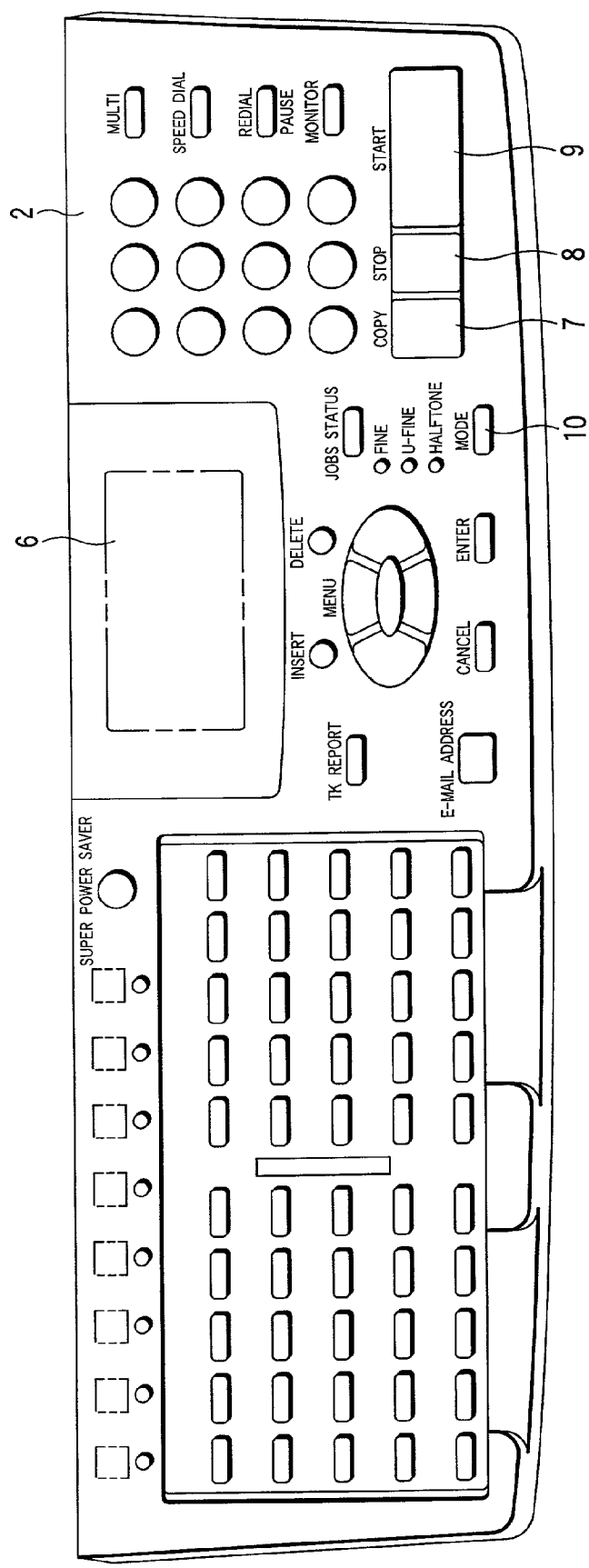
FIG. 2 is a view showing a control panel of the multifunction machine.

As shown in FIG. 2, the control panel 2 is provided with a display section 6 for displaying various information data, and keys for setting various conditions, such as a copy key 7, stop key 8, start key 9, and mode switching key 10 for switching modes.

Figure 3:
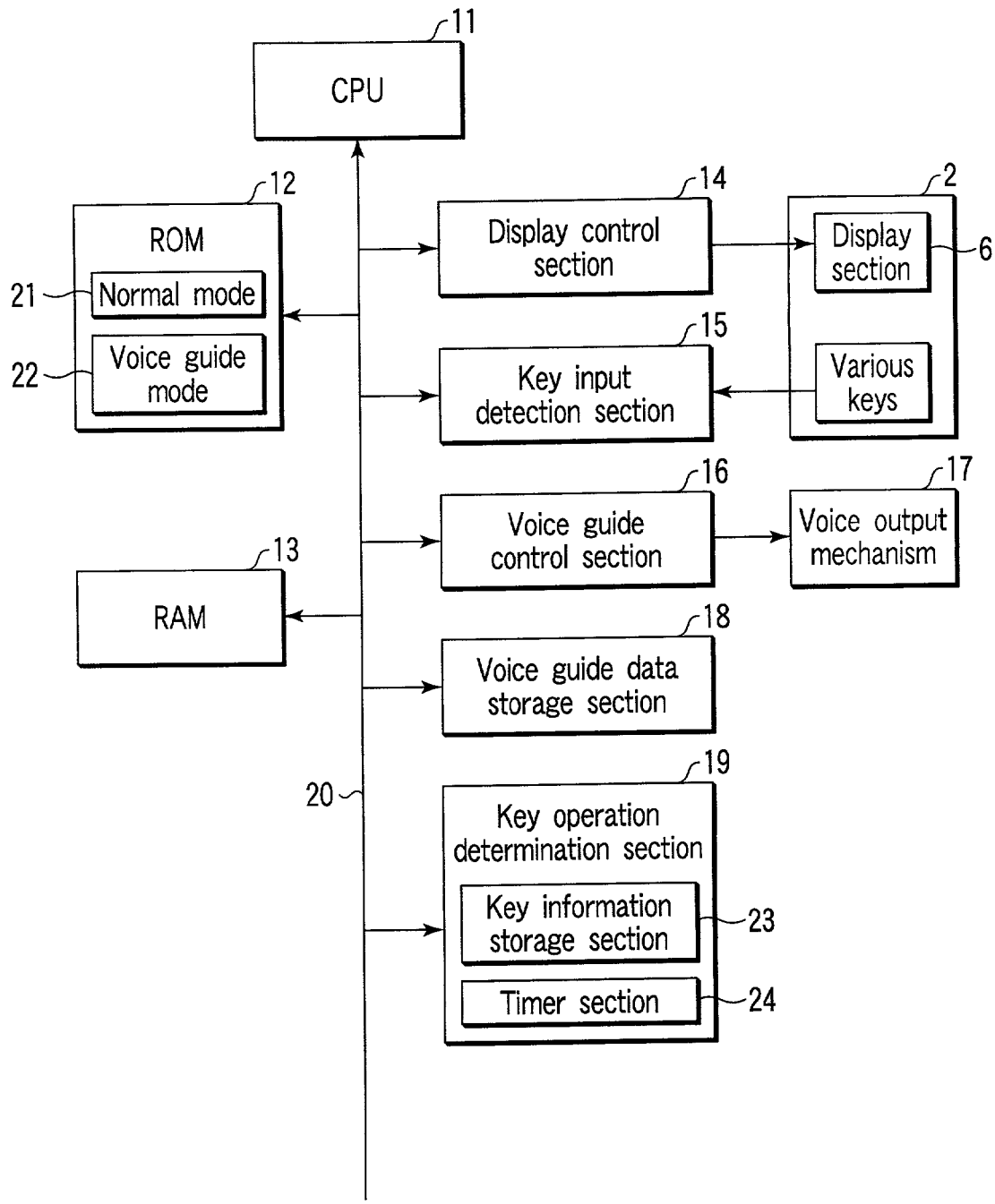
FIG. 3 is a block diagram showing a principal configuration.

The following is a description of the principal configuration of the multifunction machine 1. As shown in FIG. 3, the multifunction machine 1 comprises a CPU 11, ROM 12, RAM 13, display control section 14, display section 6, key input detection section 15, control panel 2, voice guide control section 16, voice output mechanism 17, voice guide data storage section 18, and key operation determination section 19.

Besides, the multifunction machine 1 is provided with a printing function, scanner function, facsimile function, etc. Since these functions are arranged in the same manner as conventional ones, a description of them is omitted.

The CPU 11, ROM 12, RAM 13, display control section 14, key input detection section 15, voice guide control section 16, voice guide data storage section 18, and key operation determination section 19 are connected by a bus line 20.

The CPU 11 controls the operation of the multifunction machine 1.

The ROM 12 is loaded with programs for operating the multifunction machine 1. The multifunction machine 1 is adapted to operate in a normal mode 21 or a voice guide mode 22 as an operation mode when it accepts key input.

The RAM 13 is formed having work areas for the execution of various programs by the CPU 11.

The display control section 14, key input detection section 15, voice guide control section 16, and key operation determination section 19 are controlled by means of the CPU 11.

The display control section 14 controls display on the display section 6 of the control panel 2.

The key input detection section 15 detects input operation of the various keys of the control panel 2.

The voice guide data storage section 18 is stored with voice guide data for voice guides, functions assigned to the individual keys. For example, voice guide data "START" is stored corresponding to the start key.

The voice guide control section 16 reads out the voice guide data stored in the voice guide data storage section 18. The voice guide control section 16 controls the voice output mechanism 17 to output the read voice guide data in the form of aural signals by means of a speaker or the like.

The key operation determination section 19 is provided with a key information storage section 23 and a timer section 24. The key information storage section 23 is stored with a key detected by the key input detection section 15 as key information. Set in the timer section 24 is a timer that clocks a given time preset for each piece of key information that is stored in the key information storage section 23. This given time is the sum of, for example, a necessary time for the output of voice guide data corresponding to the key information and a necessary time, e.g., 5 seconds, for key input after the voice output is heard by an operator.

The following is a description of normal mode 21 and the voice guide mode 22 of the multifunction machine 1 constructed in this manner.

The normal mode 21 is a mode such that a function assigned to each key is executed with every key input or every cycle of key operation.

The voice guide mode 22 is a mode such that a function assigned to each key is guided by voice with every key input or every cycle of key operation. When the key is operated again for the input within the time clocked by the timer set in the timer section 24, in this mode, voice guide data assigned to the key is outputted, and its function is executed.

The following is a description of a flow of processing executed when the multifunction machine 1 accepts key input in a standby state. As mentioned before, the display control section 14, key input detection section 15, voice guide control section 16, and key operation determination section 19 executes various operations under the control of the CPU 11.

When the multifunction machine 1 accepts the key input in the standby state, as shown in FIG. 4, the key input detection section 15 detects the key input (Step ST101). When the key input is detected, the CPU 11 determines the operation mode of the key input (Step ST102). If it concludes that the operation mode is the normal mode 21, the CPU 11 executes the function assigned to the depressed key, whereupon the processing is finished (Step ST103).

If the CPU 11 concludes that the operation mode is the voice guide mode 22, the key operation determination section 19 determines whether or not the key information on the detected key is stored in the key information storage section 23 (Step ST104). If the key operation determination section 19 concludes that the key input is not stored, the CPU 11 determines whether or not voice guide data is being outputted (Step ST105). If the voice guide data is being outputted, the voice guide control section 16 stops voice output (Step ST106).

If the CPU 11 stops voice output or if the CPU 11 concludes in Step ST105 that the voice guide is not being outputted, the key operation determination section 19 stores the key information storage section 23 with the detected key as key information (Step ST107).

Subsequently, the voice guide control section 16 reads out voice guide data corresponding to the aforesaid key from the voice guide data storage section 18 (Step ST108). The key operation determination section 19 sets the timer corresponding to the key information. This timer clocks a time set corresponding to the key input (Step ST109). The voice guide control section 16 controls the voice output mechanism 17 to output the read voice guide data (Step ST110).

If the key operation determination section 19 concludes in Step ST104 that the aforesaid key is stored in the key information storage section 23, the CPU 11 determines whether or not voice guide data is being outputted (Step ST111). If the voice guide data is being outputted, the voice guide control section 16 stops voice output (Step ST112).

If the CPU 11 stops voice output or if the CPU 11 concludes in Step ST111 that the voice guide is not being outputted, the voice guide control section 16 reads out voice guide data corresponding to the key information from the voice guide data storage section 18 (Step ST113). Then, the voice guide control section 16 controls the voice output mechanism 17 to output the read voice guide data (Step ST114).

Subsequently, the CPU 11 executes the function assigned to the detected key (Step ST115). When the function is executed, the key operation determination section 19 clears the information on the key stored in the key information storage section 23 (Step ST116). Thereupon, the processing is finished.

Figure 5:
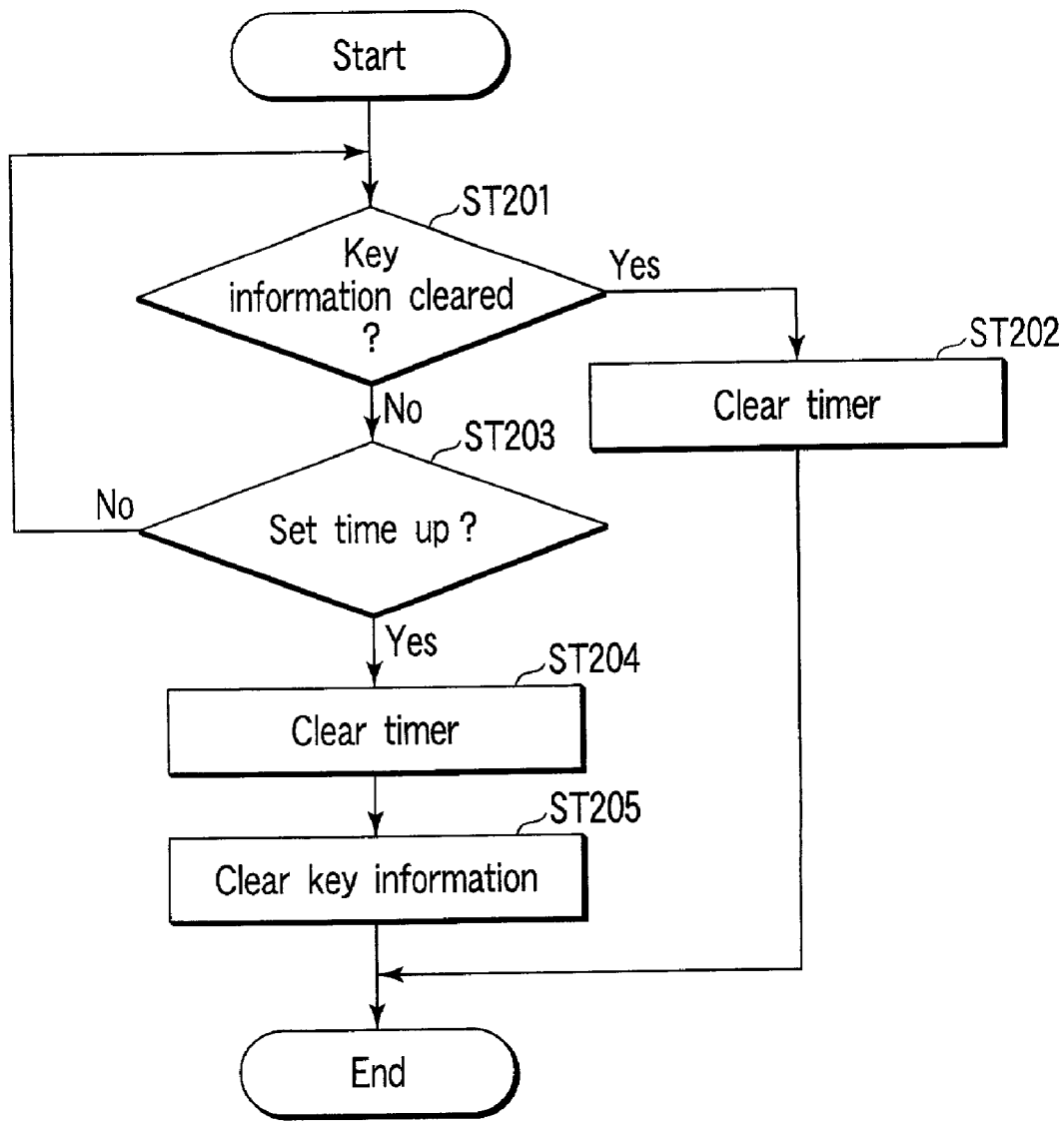
FIG. 5 is a diagram showing a flow of processing of a timer set in a detected key.

The following is a description of the processing of the timer set in the timer section 24 for each detected key. When the timer is set, as shown in FIG. 5, this processing is started. The key operation determination section 19 determines whether or not key information corresponding to this timer is cleared (Step ST201). If it is concluded that the key information is cleared, the key operation determination section 19 clears the timer set corresponding to the key information (Step ST202).

If it is concluded that the key information is not cleared, the key operation determination section 19 determines whether or not the set time set in the timer is up (Step ST203). If the time clocked by the timer is shorter than the set time, the key operation determination section 19 returns to Step ST201, whereupon it determines whether or not the key information is cleared. If it concludes that the set time is up, the key operation determination section 19 clears the set timer (Step ST204). Then, the key operation determination section 19 clears the key information (Step ST205). Thereupon, the processing is finished.

The following is a description of the way the multifunction machine operates when the operator makes key input in the voice guide mode 22, e.g., the case where the start key 9 is depressed.

The operator confirms whether or not the multifunction machine 1 is in the voice guide mode. If the multifunction machine 1 is not in the voice guide mode 22, the operator operates the mode switching key 10 to change the mode of the multifunction machine 1 into the voice guide mode 22.

Subsequently, the operator depresses the start key 9. Thereupon, "START" is voiced from the multifunction machine 1. This enables the operator to confirm the start key. If the operator depresses the start key 9 again within the given time set in the timer after the voice output, the multifunction machine 1 outputs the voice "START" and executes a starting function that is assigned to the start key.

The operator depresses the start key 9 again while the multifunction machine 1 is outputting the first "START". Thereupon, the multifunction machine 1 stops outputting the voice "START", and then outputs the voice "START" again and executes the starting function. Thus, the operator can make the second depression of the start key 9 without hearing out the first voice output "START" of the multifunction machine 1.

According to this embodiment, the operator can easily select the normal mode 21 or the voice guide mode 22 by the mode switching key 10. If the operator needs no voice guide, therefore, the operator can make a quick entry with the key input operation mode switched to the normal mode 21. If the operator needs a voice guide, the operator can learn the function of the selected key before execution without regard to the force with which the operator depresses the key. Accordingly, the operator can avoid making a mistake in entry. Thus, the operator can securely make his/her intended key input.

If another key is detected during the voice output in Step ST105 or ST112, the output of the voice guide data is stopped, and a voice corresponding to the newly detected key is outputted. However, the multifunction machine 1 may be configured so as not to accept another key input while it is outputting a voice. With this configuration, the operator can do securer key input.

In the case described above, the same voice guide data is outputted when the operator makes the predetermined key input and when he/she depresses the same key again within the given time. Alternatively, however, different voice guide data may be outputted in a manner such that "START" is outputted as the voice guide data for the function when the first key input is detected and that "START IS EXECUTED" is outputted as the voice guide data that is indicative of the execution of the function when the second key input is detected. Further, the machine may be constructed so that no voice guide data is outputted during key input, for example.

The key information stored in the key information storage section 23 is automatically cleared if the second input is accepted within a given time or when the set time in the timer is up. Thus, even if the operator depresses the start key 9 of the multifunction machine 1 that is left untouched after it is depressed once by another person, for example, therefore, the depression of the start key 9 cannot be the second input. Thus, a mistake in key input can be prevented also in this case.

In the embodiment described above, the key-input voice assistant apparatus is applied to the multifunction machine 1. However, the invention is not limited to this case. The invention is applicable to all other apparatuses that perform key input.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A key input-voice assistant apparatus comprising:
   a key for inputting;
   a voice information storage section which stores, as voice information, a content of execution of a function assigned to the key;
   a voice output mechanism which outputs the voice information;
   a mode switching key which switches an operation mode between a normal mode in which the function assigned to the key is performed when an inputting operation of the key is performed, and a voice guide mode in which the function assigned to the key is guided when the inputting operation of the key is performed;
   a key information storage section which stores key information indicating that it is detected that the inputting operation of the key is performed in the voice guide mode;
   a first determination section configured to determine whether the key information is stored in the key information storage section or not when the key is inputted in the voice guide mode;
   a second determination section configured to determine whether the voice output mechanism outputs the voice information or not, when the first determination section determines that the key information is stored in the key information storage section;
   a stopping control section configured to stop outputting of the voice information, when the second determination section determines that the voice output mechanism outputs the voice information;
   a voice information control section configured to make the voice output mechanism output the voice information stored in the voice information storage section, which is associated with the key information, when the stopping control section stops outputting of the voice information; and
   a function executing section configured to execute the function assigned to the key, when the voice information control section outputs the voice information,
   wherein, when the second determination section determines that the voice output mechanism does not output the voice information when the first determination section has determined that the key information is stored in the key information storage section, processing proceeds directly to the voice information control section, bypassing the stopping control section.

2. A key-input voice assistant apparatus according to claim 1, wherein the voice information outputted when it is determined that the key information is not stored in the voice guide mode and the voice information outputted when it is determined that the key information is stored are different from each other.

3. A key-input voice assistant apparatus according to claim 1, wherein the key information stored in the voice guide mode is automatically cleared when a preset given time is up.

4. A key input-voice assistant apparatus according to claim 1, further comprising:
   a third determination section configured to determine whether the voice output mechanism outputs the voice information or not, when the first determination section determines that the key information is not stored in the key information storage section;
   a second stopping control section configured to stop outputting of the voice information, when the third determination section determines that the voice output mechanism outputs the voice information;
   a storage control section configured to store the key information in the key information storage section, when the second stopping control section stops outputting of the voice information or the third determination section determines that the voice output mechanism does not output the voice information; and a second voice information control section configured to make the voice output mechanism output the voice information stored in the voice information storage section, which is associated with the key information, when the key information is stored in the key information storage section by the storage control section, wherein, when the third determination section determines that the voice output mechanism does not output the voice information when the first determination section has determined that the key information is stored in the key information storage section, processing proceeds directly to the second voice information control section, bypassing the second stopping control section.

5. A key-input voice assistant apparatus according to claim 1, wherein the stopping control section stops outputting of the voice information when another key is inputted or the key is re-inputted while the voice information is being outputted by the voice output mechanism, and wherein the voice information corresponding to the another key being inputted or to the key being re-inputted is controlled to be output by the voice information control section, starting at a point in time after the voice information has been stopped by the stopping control section.

6. A key input-voice assistant method comprising:
inputting a key;
storing, as voice information in a voice information storage section, a content of execution of a function assigned to the key;
outputting, by a voice output mechanism, the voice information;
switching, by a mode switching key, an operation mode between a normal mode in which the function assigned to the key is performed when an inputting operation of the key is performed, and a voice guide mode in which the function assigned to the key is guided when the inputting operation of the key is performed;
storing, in a key information storage section, key information indicating that it is detected that the inputting operation of the key is performed in the voice guide mode;
determining, by a first determination section, whether the key information is stored in the key information storage section or not when the key is inputted in the voice guide mode;
determining, by a second determination section, whether the voice output mechanism outputs the voice information or not, when the first determination section determines that the key information is stored in the key information storage section;
stop outputting the voice information, by a stopping control section, when the second determination section determines that the voice output mechanism outputs the voice information;
making, by a voice information control section, the voice information stored in the voice information storage section which is associated with the key information to be outputted, when the stopping control section stops outputting of the voice information;
making, by the voice information control section, the voice information stored in the voice information storage section which is associated with the key information to be outputted, thereby bypassing the stopping control section, when the key information storage section determines that the voice output mechanism does not output the voice information when the first determination section has determined that the key information is stored in the key information storage section; and executing, by a function executing section assigned to the key, the function assigned to the key, when the voice information control section outputs the voice information.

7. A key input-voice assistant method according to claim 6, further comprising:
determining, by a third determination section, whether the voice output mechanism outputs the voice information or not, when the first determination section determines that the key information is not stored in the key information storage section;
stop outputting of the voice information, by a second stopping control section, when the third determination section determines that the voice output mechanism outputs the voice information;
storing, in a storage control section, the key information in the key information storage section, when the second stopping control section stops outputting of the voice information or the third determination section determines that the voice output mechanism does not output the voice information; and
making, by a second voice information control section, the voice output mechanism output the voice information stored in the voice information storage section which is associated with the key information, when the key information is stored in the key information storage section by the storage control section,
wherein, when the third determination section determines that the voice output mechanism does not output the voice information when the first determination section has determined that the key information is stored in the key information storage section, processing proceeds directly to the second voice information control section, bypassing the second stopping control section.

8. A key-input voice assistant method according to claim 6, wherein the voice information outputted when it is determined that the key information is not stored in the voice guide mode and the voice information outputted when it is determined that the key information is stored are different from each other.

9. A key-input voice assistant method according to claim 6, further comprising:
automatically clearing the key information stored in the voice guide mode when a preset given time is up.

10. A key-input voice assistant method according to claim 6, the method further comprising:
detecting the key being re-inputted or another key being inputted while the voice information is being output; and
stopping output, by the stopping control section, of the voice information that is being output due to the key being inputted;
wherein the voice information corresponding to the another key being inputted or to the key being re-inputted is controlled to be output by the voice information control section, starting at a point in time after the voice information has been stopped by the stopping control section.

* * * * *